C. R. BRINCKERHOFF.
Harvester.
No. 29,053.
2 Sheets—Sheet 2.
Patented July 10, 1860.
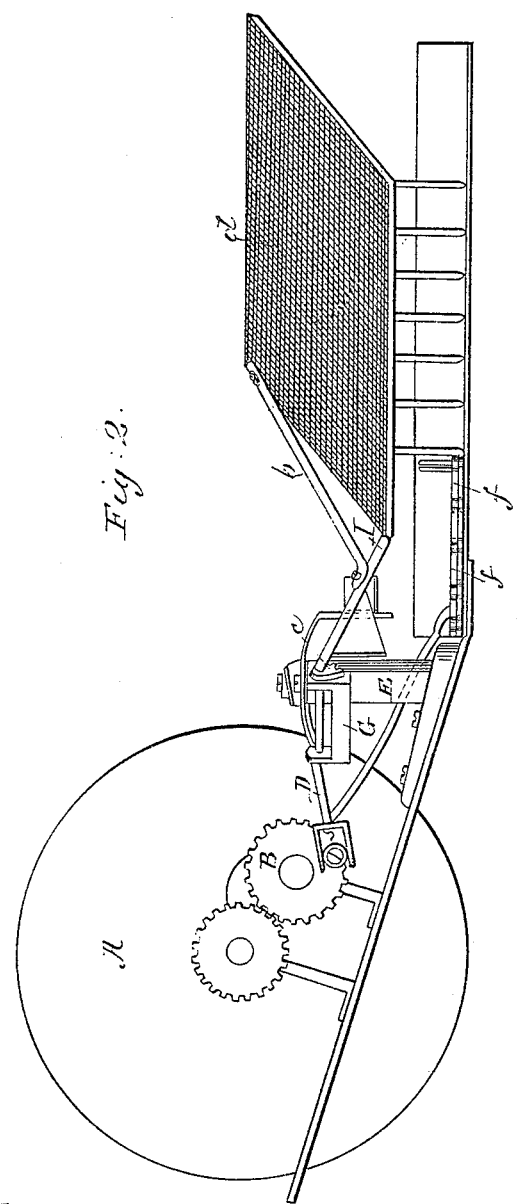

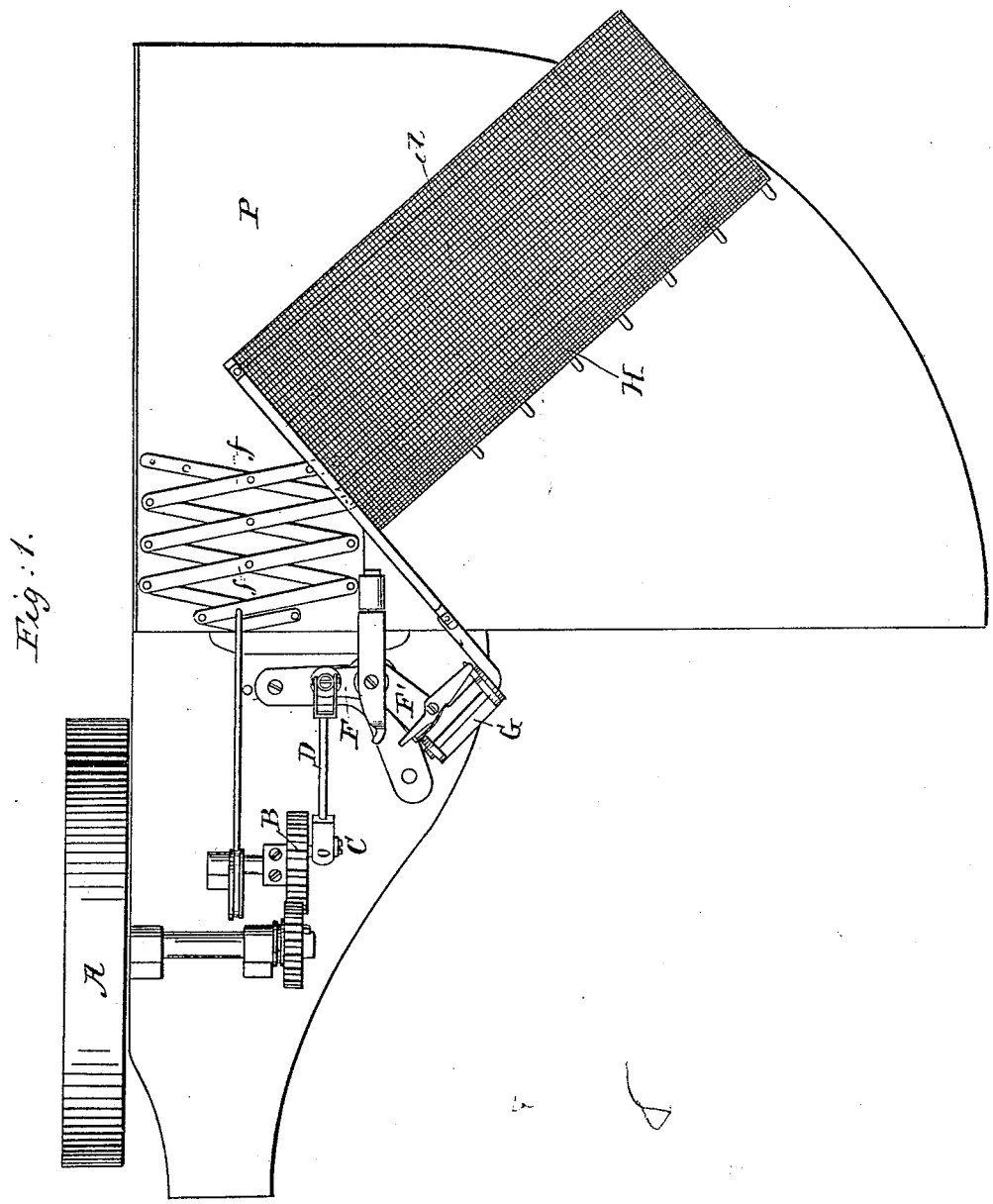

UNITED STATES PATENT OFFICE.

CORNELIUS R. BRINCKERHOFF, OF BATAVIA, NEW YORK.

IMPROVEMENT IN HARVESTERS.

Specification forming part of Letters Patent No. 29,053, dated July 10, 1860.

*To all whom it may concern:*

Be it known that I, CORNELIUS R. BRINCKERHOFF, of Batavia, in Genesee county, in the State of New York, have invented new and useful Improvements in the Harvesting-Machine; and I do hereby declare that the following is a full and exact description thereof, reference being had to the accompanying drawings and the letters of reference thereon.

My invention relates, first, to the arrangement of a back-action rake, in combination with the means for operating it, and with the main frame, platform, and driving-wheel; and, secondly, to an arrangement and combination of a discharging-rake, with the platform and back-action rake and the operating mechanism, as hereinafter fully described.

To enable others skilled in the art to make and use my invention, I will proceed to state the manner of its construction and the mode of its operation.

In my original invention the power to operate the rake was communicated by the main shaft through a crank to an arm or lever attached to said crank and also to a sleeve which moved on a slide connected in front to the crank-shaft, which sleeve was also connected to another arm or lever, which was at its opposite end connected to an eighth-arm of the sweep-post therein; but in this invention, which in this respect is an improvement upon my former one, the power for operating the rake is communicated by a cogged wheel on the interior end of the main shaft through another similar wheel on a crank-shaft to an arm or pitman connected with said crank at one end and to an eighth-arm of a sweep-post at the other end, said sweep-post being placed on the rear interior corner of the main frame of the machine.

In the drawings, the letter A represents the wheel on the main shaft; letter B, the wheel on the crank-shaft; letter C, the crank, and the letter D the arm or pitman; the letter E, the sweep-post, and the letter F the eighth-arm thereof.

By this invention the power to move the rake is applied in the most direct manner and thereby avoids the complex machinery of the said first invention and tends to cheapen the cost of the machine. The sweep-post has a gyratory motion communicated by the mechanism before mentioned, whereby another arm thereof, which is angular in shape and is designated by the letter F', is caused to move circularly with the motion of the sweep-post. The arm F', with its angle, occupies a horizontal position and the outer part of this angular arm sustains in boxes the horizontal shaft of the rake-shank, and is marked G. The head of the rake is made of iron and has a crank connected with it of the same material.

The rake-head is designated by the letter H, and the crank thereof is inclined upwardly from the rake-head when the rake is at rest, and is connected with the horizontal shaft before mentioned. The inclined shank is marked by the letter I on the drawings.

On the arm F of the sweep-post, and in rear of the horizontal shaft of the rake-shank, is a latch and spring, and on the lower side of said part of said shank, but outside of the box, near the angle, is a piece of casting, in which is a catch, (marked e,) and on the lower side of the inclined crank of the shank of the rake (marked I) is affixed a plate of metal of nearly triangular shape, and on a bar of metal that passes over the sweep-post and is bent down toward the finger-beam or platform is a roller, against which the triangular piece of metallic plate strikes and over which it rises for the delivery of its gavel, and also to admit of the action of the latch, so nearly similar to such devices for like purposes in my former invention that a reference to the specification in that case is made for them and their principle of action. The rake-head is furnished with a divider-frame, made of small bars or rods of iron and is of rectangular shape. It is fastened to the rake-head by screw-bolts passing through the lower side of the frame into the rake-head, and by a brace from the inclined crank of the shank of the rake to near the top of the end thereof nearest to the driving-wheel, and said brace is fastened to said rake-frame and to the inclined crank by screw-bolts. The frame for the rake-head is intended to divide the falling grain from the gavel about to be removed, and is placed in a position on said rake-head inclining backwardly therefrom at an angle of about forty-five degrees, and it is covered with a divider of enameled or painted cloth, which as the rake is made to recede with a gavel, will permit the falling grain to slip easily to the platform. The brace aforesaid is designated by the letter b, and the divider and its frame are designated by the letter d. It is evident that the brace b will serve also to prevent the falling grain from getting out of position on the rake or its divider, and that a cloth or other material fastened to the brace on one side and to the divider-frame and the crank I of the shank of the rake will also serve to prevent short grain—as oats or barley—from being wasted by slipping off of that end of the rake-divider. It is also obvious that the action of the rake might be made more effective by using the spiral spring on the horizontal part of the shaft thereof, as set forth in my said former invention.

The second platform is affixed at the delivery side of the first platform and has the outer edge thereof turned up as a rest, against which the cut grain is delivered by the rake, and it thus serves to aid in compressing the gavels into the form for a sheaf, and the cut grain is delivered therefrom by a rake-head affixed to the exterior end of compound elongating levers, which are operated by a cam on the crankshaft, and their action is so adjusted as to deliver each gavel immediately upon its having been deposited on the second platform by the rake and while the rake is returning to the front of the platform for another gavel. Said second platform is marked P, the elongating levers are marked $f$, and said platform is so arranged as to be removable at pleasure with the elongating levers, that green or wet grain may be permitted to lie in loose gavels to cure or to dry before being bound.

Having thus set forth my invention and its mode of operation, what I claim therein as new, and desire to secure by Letters Patent, is—

1. The peculiar construction, location, and arrangement of the back-action rake, the gearing, and the mechanism for connecting them, in combination with the driving-wheel, platform, and main frame, substantially as described.

2. The arrangement of the compound elongating levers $f$ $f$, operated by the eccentric on the shaft B, in combination with the platform and the back-action rake or its equivalent, in the manner and substantially as described, for the purpose specified.

In testimony of which invention I have hereunto set my hand this 9th day of May, A. D. 1860.

CORNELIUS K. BRINCKERHOFF.

Attest:
  JOHN W. BOWMAN,
  S. D. WHITLOCK.